(12) United States Patent
Scheps et al.

(10) Patent No.: US 9,958,664 B2
(45) Date of Patent: May 1, 2018

(54) DEVICE FOR FORMING AN IMMERSION FILM

(71) Applicant: Carl Zeiss Microscopy GmbH, Jena (DE)

(72) Inventors: Alexander Scheps, Adelebsen (DE); Georg Herbst, Goettingen (DE); Ingo Fahlbusch, Goettingen (DE); Timo Rojahn, Uslar (DE); Jakow Konradi, Aachen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days. days.

(21) Appl. No.: 14/319,210

(22) Filed: Jun. 30, 2014

(65) Prior Publication Data

US 2015/0015943 A1 Jan. 15, 2015

(30) Foreign Application Priority Data

Jul. 11, 2013 (DE) .................. 10 2013 011 544

(51) Int. Cl.
*G02B 21/33* (2006.01)
*G02B 21/24* (2006.01)
*G02B 21/00* (2006.01)

(52) U.S. Cl.
CPC .............. *G02B 21/33* (2013.01); *G02B 21/24* (2013.01); *G02B 21/0088* (2013.01)

(58) Field of Classification Search
CPC ......... G02B 21/34; G02B 21/26; B01L 3/508; B01L 2300/0822; G01N 1/36
(Continued)

(56) References Cited

U.S. PATENT DOCUMENTS 8,199,407 B2 *  6/2012  Liebel .................... G02B 21/24
                                                        359/509
2004/0263961 A1 * 12/2004  Hummel ................ G02B 21/33
                                                        359/391
(Continued)

FOREIGN PATENT DOCUMENTS

DE          19746661 C1     5/1999
DE          10050825 A1     4/2002
(Continued)

OTHER PUBLICATIONS

European Search Report for European Application No. EP14171932 dated Nov. 14, 2014. English translation not available.
(Continued)

*Primary Examiner* — Stephone B Allen
*Assistant Examiner* — Rahman Abdur
(74) *Attorney, Agent, or Firm* — Patterson Thuente Pedersen, P.A.

(57) ABSTRACT

A device for forming an immersion film between a front lens of a microscope objective and a preparation on an inverted microscope. The device includes a protection device for preventing fluid leakage from the immersion film region, and an apparatus for supplying the immersion fluid (auto-immersion) to the immersion film region. The protection device is arranged statically in the main part of the microscope stand and the means for supplying immersion fluid to the immersion film region is connected to the protection device by means of an Aquastop system.

12 Claims, 4 Drawing Sheets

(58) Field of Classification Search
USPC ....... 359/398, 362, 363, 368, 369, 381, 384, 359/509, 656, 507, 508, 510, 511, 512, 359/513, 514
See application file for complete search history.

(56) References Cited

U.S. PATENT DOCUMENTS

| | | | |
|---|---|---|---|
| 2006/0164721 A1* | 7/2006 | Uhl | G02B 21/025 359/368 |
| 2006/0274424 A1 | 12/2006 | Okazaki et al. | |
| 2006/0275918 A1* | 12/2006 | Harada | G02B 21/33 436/174 |
| 2007/0103661 A1 | 5/2007 | Nishii | |
| 2010/0027109 A1 | 2/2010 | Liebel et al. | |
| 2010/0315705 A1 | 12/2010 | Harada et al. | |
| 2012/0134017 A1* | 5/2012 | Ganser | G02B 21/26 359/383 |

FOREIGN PATENT DOCUMENTS

| | | | |
|---|---|---|---|
| DE | 20205080 | 6/2002 | |
| DE | 10333326 | 3/2005 | |
| DE | 102006042088 | 3/2008 | |
| EP | 1489461 | 12/2004 | |
| EP | 1717628 | 11/2006 | |
| EP | 1980892 A1 * | 10/2008 | ............ G02B 21/33 |
| WO | WO02093232 | 11/2002 | |
| WO | WO 2005010591 | 2/2005 | |

OTHER PUBLICATIONS

Wikipedia "AQUASTOP" http://de.wikipedia.org/w/index.php?title=Aquastop&oldid=116036845. As accessed on Feb. 4, 2015. English translation provided.

German Search Report for German Application No. DE 102013011544.2, dated Sep. 3, 2013. English translation provided.

Aqua Stop System specifications, Axiovert 200 Operating Manual, Carl Zeiss Light Microscopy, dated Mar. 30, 2001, pp. 2-28-2-30.

* cited by examiner

DEVICE FOR FORMING AN IMMERSION FILM

RELATED APPLICATIONS

This application claims the benefit of German National Patent Application No. 102013011544.2, filed on Jul. 11, 2013, said application being hereby fully incorporated herein by reference.

FIELD OF THE INVENTION

The invention relates to a device for forming an immersion film between a front lens of a microscope objective and a preparation on an inverted microscope, including a protection device for preventing fluid leakage from the immersion film region, and elements supplying the immersion fluid (auto-immersion) to the immersion film region with supply, discharge, control, and sensor lines.

BACKGROUND OF THE INVENTION

Immersion fluids are fluids which have a refractive index close to the refractive index of the glass used for sample carriers and lenses. If an air gap between an objective lens and a sample carrier is filled with such an immersion fluid, the numerical aperture of the objective increases. This results in increased light intensity and increased resolving power of the objective.

With increasing automation of work processes in microscopy, the demand for an automated supply of said immersion fluids has also increased. The reason for such a demand is the fact that the accessibility to the front of the objective of modern, particularly inverted, microscopes has become increasingly difficult due to the increasing complexity of the systems and the ever increasing objective aperture, and therefore, manual immersing is frequently no longer possible.

Inverted microscopes operating with immersion objectives are usually also provided with a protection device, designed to protect the microscope from the discharging immersion medium and other liquids. Such devices, which have elements in the form of protection devices attached to the objective, are, for example, described in DE 103 33 326 A1 and DE 100 50 825 A1. Even though an element attached to the objective provides a protected immersion film region, these solutions are disadvantageous because immersion fluid can leak within the entire system. Furthermore, the production-related effort is very high since a special protection device has to be provided for every objective.

Proceeding from the disadvantages of the solutions of the aforementioned prior art, the invention addresses the problem of further developing a device for forming an immersion film on an inverted microscope such that a leakage during supply and during microscopic examination at minimized production-related effort is virtually impossible.

SUMMARY OF THE INVENTION

According to the invention, the aforementioned problems presented by prior art devices are solved with a device of the initially described type including a protection device for preventing fluid leakage from an immersion film region, and an apparatus supplying immersion fluid to the immersion film region and having supply, discharge, control, and sensor lines, wherein the protection device is arranged statically in the main part of the microscope stand and the apparatus supplying immersion fluid to the immersion film region is connected to the protection device through an Aquastop system.

According to embodiments of the invention, the protection device is arranged statically in the main part of the microscope stand, i.e., it is not an element permanently connected to the microscope objective. Furthermore, the elements supplying immersion fluid to the immersion film region are directly connected to the protection device by means of an Aquastop system.

Therefore, a solution according to embodiments of the invention is a combination of auto-immersion, i.e. the automatic supply of the immersion fluid, and the Aquastop system with the protection device. The microscope objectives are typically attached to a nosepiece (objective changer).

According to the solutions of the prior art, i.e. if the means for supplying immersion fluid is directly connected to the objective, the control of the auto-immersion and/or supply and discharge of the immersion fluid must be realized by means of a unit which compensates the movement of the nosepiece (objective changer), which is generally very elaborate.

The device according to embodiments of the invention enables static installation of the supply and discharge lines and the control and sensor lines in a relatively simple manner within the main part of the microscope itself. In the event of an interruption of the supply of the immersion fluid, it is thus no longer necessary to replace the entire objective. It suffices to simply replace the Aquastop system, resulting in a significantly lower effort.

Moreover, only one apparatus for supplying the immersion fluid to the immersion film region is required for the objectives arranged in the nosepiece (objective changer) while each objective requires its own apparatus in the solutions according to the prior art.

Advantageously, a protection device according to embodiments of the invention includes a stationary base plate having a cutout centrically oriented toward the beam path for receiving an elastic membrane, wherein the membrane has an opening centrically oriented toward the beam path for the front lens of the microscope objective.

As long as the microscope objective is within the workspace, the membrane forms a tight seal with the front geometry of the objective, and so optics and mechanics located below the base plate and the microscope stage are protected from leaking liquid. In an advantageous embodiment, the cutout in the base plate and the opening in the membrane are designed circularly, wherein, particularly for the cutout in the base plate, other contours are also conceivable.

Expediently, the membrane has at least one element (channel) for supplying the immersion fluid to the immersion film region, wherein said element or elements can also be used for suctioning the immersion fluid. In some cases, it may also be useful if the membrane has a separate element for suctioning the immersion fluid.

An advantageous embodiment also has a membrane with a plurality of elements for supplying and suctioning of the immersion fluid, so these processes can be executed simultaneously. For example, the membrane can be a molded part with a plurality of integrated channels.

The suctioning of the immersion fluid is especially useful prior to an objective change. The objective is moved out from the workspace in the Z-direction until it loses contact with the membrane. Once there is sufficient distance between the objective and the membrane, a different objective can be introduced into the beam path by turning the nosepiece or switching of a changing device. When the new objective slides into its workspace, contact is once again made automatically with the membrane, and the function of the Aquastop system is once again restored. The suction function can also be used to control the immersion fluid during microscope operation.

Suctioning during microscope operation is not necessarily required because the function of the Aquastop system once again applies. If more immersion fluid is supplied than can be held by the liquid column, the immersion fluid is guided to the discharge point or discharge points of the Aquastop system by the membrane.

It can also be advantageous to operate with a surplus of immersion fluid in order to ensure that there is always sufficient fluid between the objective and the preparation or also to definably rinse the region between the objective and the preparation. This, for example, enables removal of dirt particles.

In an advantageous embodiment, sensors are provided which can detect the amount of immersion fluid between the microscope objective and the preparation, and so the auto-immersion can be controlled in the event of changes. Also advantageously, contact surfaces may be vapor deposited onto the membrane upper side for the purpose of detecting such changes.

Furthermore, an advantageous embodiment has a membrane including two single membranes superimposed upon each other, between which the immersion fluid can be supplied to and drained from the front lens of the microscope objective. The two membranes form a seal in the region of the outer diameter. The immersion fluid which is pumped between the membranes can only escape at the inner diameter, i.e. in the region of the front lens of the microscope objective. In this alternative, the immersion fluid can also be supplied and suctioned.

Peristaltic, micro annular gear, membrane, or piezo-pumps, for example, can be used as pumps, wherein these pumps are controlled either in accordance with the surplus principle or by means of a controlled output.

It may also be advantageous if the opening in the membrane has a sealing edge for the purpose of improved retaining of the immersion fluid on the front lens of the microscope objective.

Furthermore, in an advantageous embodiment of a device according to the invention, the Aquastop system is characterized by at least one discharge channel in the base plate with which the excess immersion fluid passing over the membrane can be discharged.

Expediently, supply, discharge, control, and sensor lines are arranged statically in the main part of the microscope.

A further advantageous embodiment has sensors which can detect the amount of immersion fluid between the microscope objective and a preparation, and so the auto-immersion can be controlled in the event of changes.

Advantageously, contact surfaces are vapor deposited onto the membrane upper side for the purpose of detecting changes.

BRIEF DESCRIPTION OF THE DRAWINGS

The invention may be more completely understood in consideration of the following detailed description of various embodiments of the invention in connection with the accompanying drawings, in which.

Figure 1:
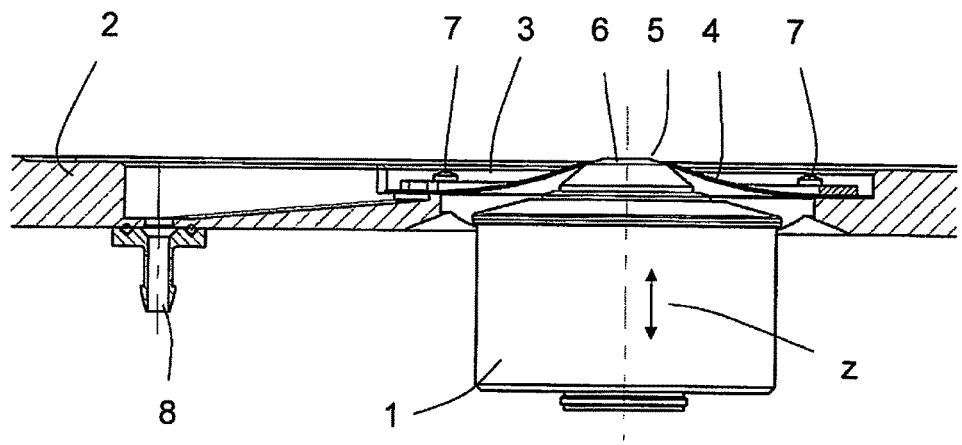
FIG. 1 is a schematic depiction of the device according to the invention with a membrane.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION

FIG. 1 shows an objective 1 of an inverted microscope arranged in a working position below a scanning stage, arranged in the main part of the microscope stand, and having a stationary base plate 2. Centrically to the beam path, the base plate 2, serving as a protection device, has a circular cutout 3. An elastic membrane 4, having centrically a circular opening 5 for the radiation passage of a front lens 6 of the microscope objective 1, is disposed in the cutout 3 and is connected to the base plate 2 with fastening elements 7.

As long as the objective 1 is in the working position, the membrane 4 forms a tight seal with the front geometry of the microscope objective 1. As a result, optics and mechanics, located below the scanning stage, are protected from leaking liquid (protection device). At the same time, the Aquastop system functions in this position. The Aquastop system may be a system for protecting sensitive components from fluid spills and dirt as produced under the Aquastop name by Carl Zeiss AG of Jena, Germany or equivalent. Excess immersion fluid is discharged by means of a discharge channel 8.

Figure 2:
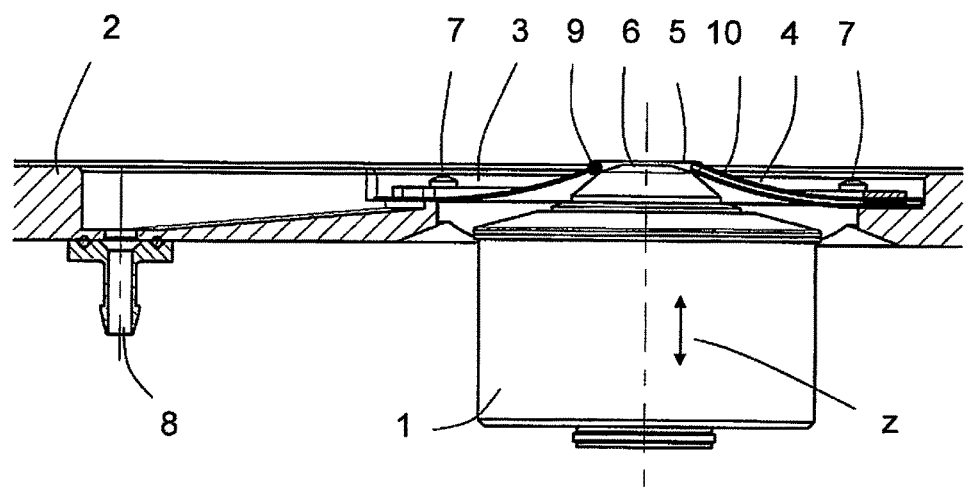
FIG. 2 is a schematic depiction of the arrangement of the membrane with an edge for better retaining the immersion fluid.
Figure 3:
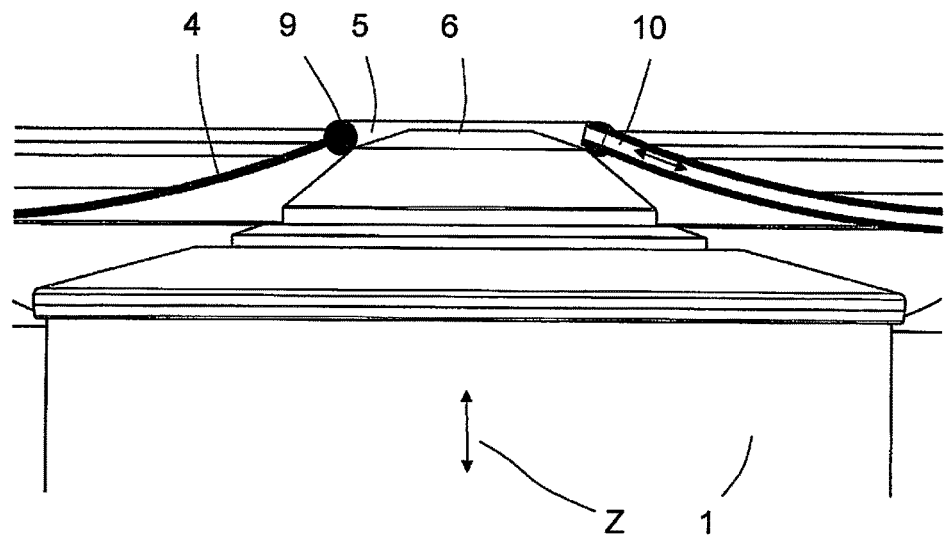
FIG. 3 is a magnified depiction of the membrane according to FIG. 2.

FIGS. 2 and 3 show depictions of the membrane 4 with an additional sealing edge 9 with a circular cross section and a diameter of approximately 2.5 mm. Due to the sealing edge 9, a better retention of the immersion fluid on the front lens 6 is provided. Furthermore, the membrane 4 has element 10 (channel) for supplying the immersion fluid to the immersion film region which can also be used for discharging or suctioning of the immersion fluid.

Figure 4:
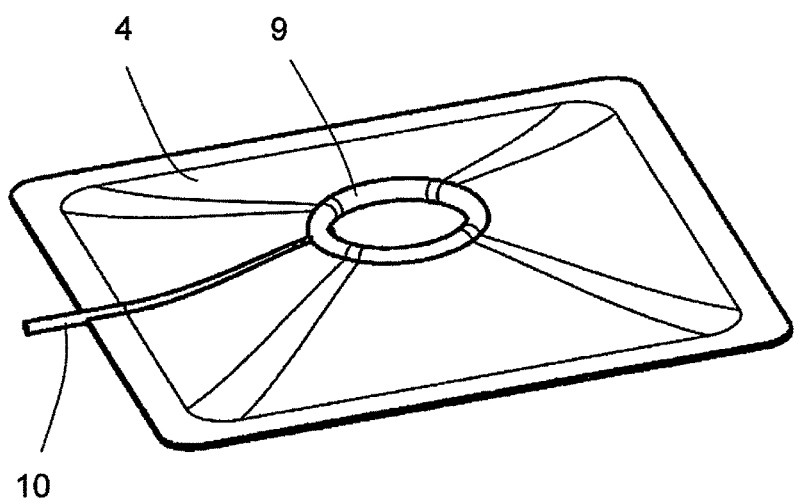
FIG. 4 is a schematic depiction of the membrane as molded part.

FIG. 4 depicts the membrane 4 as a molded part with a thickness of approximately 0.5 mm. In this embodiment, it has the element 10 (channel) described according to FIGS. 2 and 3 for supplying and/or discharging the immersion fluid. The integration of a plurality of such channels is also conceivable.

Figure 5:
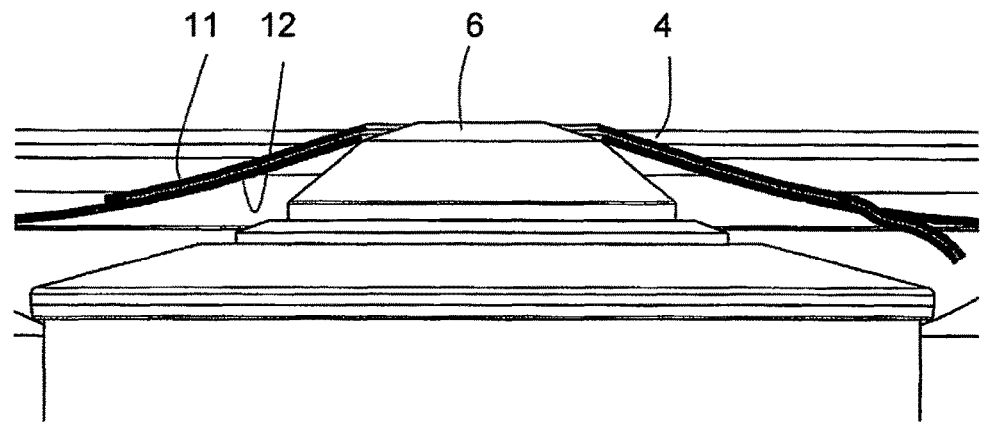
FIG. 5 is a schematic depiction of a double-walled membrane.

FIG. 5 depicts the Aquastop system with a double-walled membrane 4, including two thin single membranes 11 and 12, between which the immersion fluid is fed to the front lens 6, wherein the two single membranes 11 and 12 form a seal with one another in the region of their outer diameters. The immersion fluid which is pumped between the single membranes 11 and 12 can only escape at the inner diameters, i.e. in the region of the front lens 6. In this example, the immersion fluid can also be supplied and discharged.

Figure 6:
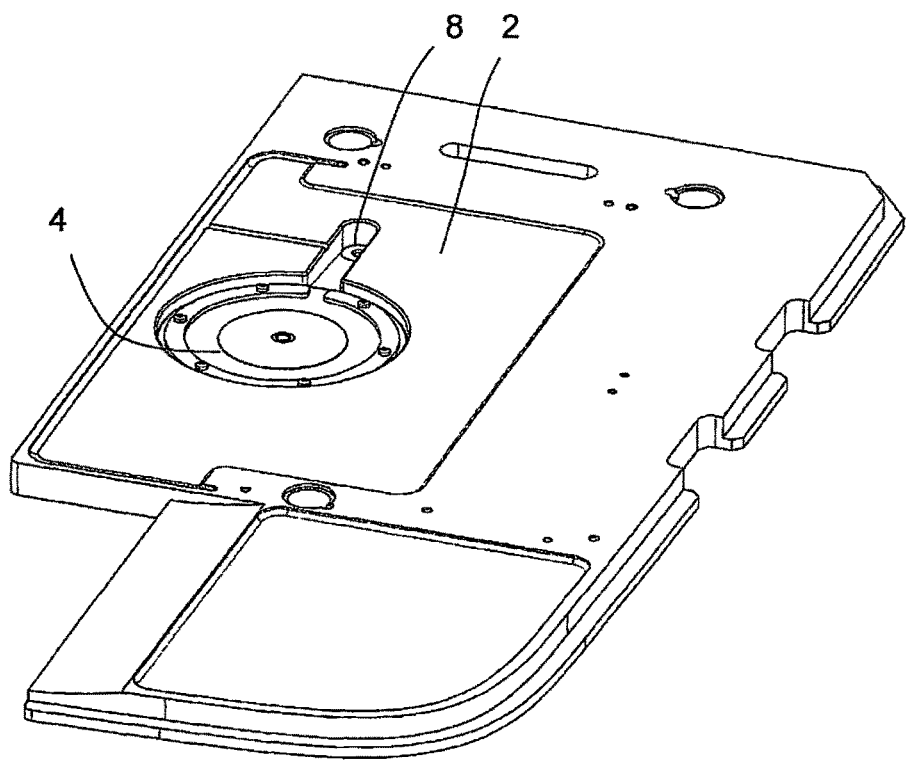
FIG. 6 is a schematic depiction of the position of the membrane in the base plate of the microscope.

FIG. 6 depicts the position of the membrane 4 in the base plate 2 of the scanning stage. Due to the Aquastop system, excess immersion fluid is discharged through the discharge channel 8 or suctioned by means of the membrane 4.

Figure 7:
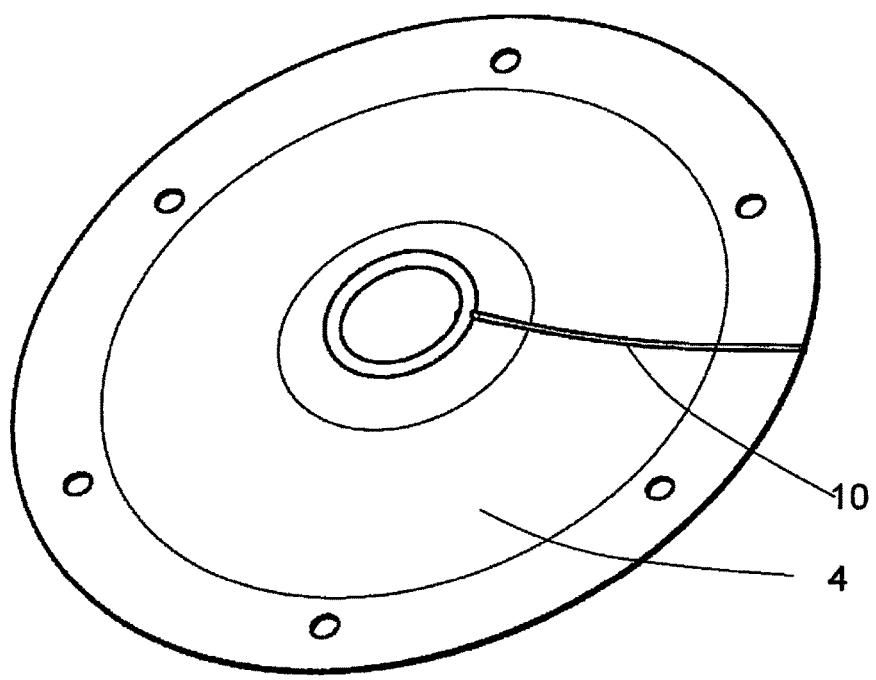
FIG. 7 is a schematic depiction of the membrane according to FIG. 6.

FIG. 7 depicts membrane 4 according to FIG. 6 with integrated element 10 (channel) for supplying immersion fluid to the immersion film region.

The invention claimed is:

1. A device for forming an immersion film between a front lens of an objective of a microscope and a preparation being examined using the microscope, the device comprising a protection device for preventing fluid leakage from an immersion film region, and an apparatus supplying immersion fluid to the immersion film region and having supply, discharge, control, and sensor lines, wherein the protection device is arranged statically in a main part of a stand of the microscope and the apparatus supplying immersion fluid to the immersion film region is connected to the protection device through a separate system inhibiting liquid ingress to the immersion film region, wherein the protection device comprises a stationary base plate having a cutout centrically oriented toward a beam path of the microscope, the cutout receiving an elastic membrane, the elastic membrane having an opening centrically oriented toward the beam path for the front lens of the objective, and wherein the membrane is double-walled and comprises two single membranes superimposed upon each other, the single membranes defining a space therebetween through which the immersion fluid can be supplied and drained.

2. The device of claim 1, wherein the membrane forms a tight seal with the front lens.

3. The device of claim 1, wherein the cutout of the base plate and the opening in the membrane are circular.

4. The device of claim 1, wherein the membrane includes a portion of the apparatus supplying immersion fluid to the immersion film region.

5. The device of claim 4, wherein the apparatus supplying immersion fluid to the immersion film region is also adapted to remove immersion fluid.

6. The device of claim 1, wherein the membrane has at least one separate element for suctioning immersion fluid.

7. The device of claim 1, wherein the membrane is a molded part with at least one integrated channel for supplying immersion fluid and at least one channel for discharging immersion fluid.

8. The device of claim 1, wherein the opening in the membrane has a sealing edge.

9. The device of claim 1, wherein the system inhibiting liquid ingress to the immersion film region comprises at least one discharge channel in the base plate.

10. The device of claim 1, wherein the supply, discharge, control, and sensor lines are arranged statically in the main part of the stand of the microscope.

11. The device of claim 1, further comprising a plurality of sensors disposed so as to detect the amount of immersion fluid between the objective and the preparation.

12. The device of claim 1, wherein a plurality of contact surfaces are vapor deposited onto an upper side of the membrane for the purpose of detecting changes.

* * * * *